(12) United States Patent
Mizutani

(10) Patent No.: US 7,789,565 B2
(45) Date of Patent: Sep. 7, 2010

(54) FLUID DYNAMIC BEARING APPARATUS

(75) Inventor: Toshiyuki Mizutani, Kuwana (JP)

(73) Assignee: NTN Corporation, Osaka (JP)

( * ) Notice: Subject to any disclaimer, the term of this patent is extended or adjusted under 35 U.S.C. 154(b) by 777 days.

(21) Appl. No.: 10/591,586

(22) PCT Filed: Mar. 3, 2005

(86) PCT No.: PCT/JP2005/003580

§ 371 (c)(1),
(2), (4) Date: May 22, 2007

(87) PCT Pub. No.: WO2005/088143

PCT Pub. Date: Sep. 22, 2005

(65) Prior Publication Data

US 2007/0292059 A1 Dec. 20, 2007

(30) Foreign Application Priority Data

Mar. 16, 2004 (JP) .............................. 2004-075101

(51) Int. Cl.
*F16C 32/06* (2006.01)

(52) U.S. Cl. ..................... 384/100; 384/107; 384/123

(58) Field of Classification Search ............... 384/100, 384/107, 108, 111–115, 118–123
See application file for complete search history.

(56) References Cited

U.S. PATENT DOCUMENTS

| 4,797,009 A * | 1/1989 | Yamazaki ............... 384/100 |
| 5,046,863 A * | 9/1991 | Sakatani et al. ......... 384/101 |
| 5,988,887 A * | 11/1999 | Lee ....................... 384/107 |
| 6,836,040 B2 * | 12/2004 | Watanabe et al. ........ 310/90 |
| 7,004,634 B2 * | 2/2006 | Aiello .................... 384/112 |

FOREIGN PATENT DOCUMENTS

| JP | 57037116 A * | 3/1982 |
| JP | 58-84421 | 6/1983 |
| JP | 2-24123 | 2/1990 |
| JP | 03260415 A * | 11/1991 |
| JP | 11-190344 | 7/1999 |
| JP | 2003-239951 | 8/2003 |

* cited by examiner

*Primary Examiner*—Thomas R Hannon
(74) *Attorney, Agent, or Firm*—Wenderoth, Lind & Ponack, L.L.P.

(57) ABSTRACT

A smooth surface of a shaft member is divided from an outer circumferential surface by a step so that its axial length dimension becomes shorter than the axial length dimension of a hydrodynamic groove region formed on the inner circumferential surface of a bearing sleeve, whereby the hydrodynamic groove regions excluding lower portions of a land between hydrodynamic grooves oppose the smooth surface.

6 Claims, 4 Drawing Sheets

FLUID DYNAMIC BEARING APPARATUS

BACKGROUND OF THE INVENTION (1) Field of the Invention

The present invention relates to a fluid dynamic bearing apparatus which supports a shaft member in a non-contact manner by the hydrodynamic effect of a fluid which is produced in a bearing gap.

(2) Description of the Related Art

This fluid dynamic bearing apparatus is for use in spindle motors for disk apparatuses, polygon scanner motors for laser beam printers (LBP) and in other small motors. Enhanced speed, cost reduction, noise reduction, etc., as well as high rotational accuracy, are required for these motors. One of the components which determine these required performances is a bearing which supports spindles of the motors. In recent years, the use of a fluid dynamic bearing having excellent characteristics for the above required performance has been considered or actually used. For example, in a spindle motor of a disk drive unit such as HDD, a fluid dynamic bearing apparatus which uses a fluid dynamic bearing for each of a radial bearing portion which supports a shaft member in the radial direction and a thrust bearing portion which supports the shaft member in the thrust direction is used. In this fluid dynamic bearing apparatus, hydrodynamic grooves are provided as a hydrodynamic pressure producing means on the inner circumferential surface of a bearing sleeve which forms the radial bearing portion or on the outer circumferential surface of the shaft member. The hydrodynamic grooves are also provided on both end faces of a flange portion of the shaft member which forms the thrust bearing portion or on the faces opposing these (end faces of the bearing sleeve, end faces of a thrust plate, etc.) (for example, refer to Japanese Unexamined Patent Publication No. 2003-239951).

When these hydrodynamic grooves are formed, especially when the hydrodynamic grooves are formed on the inner periphery of the bearing sleeve, the method of processing the hydrodynamic grooves is critical. As an examples of such a processing method, a method comprising inserting a mold having a groove pattern corresponding to the shape of the hydrodynamic grooves at the inner periphery of a bearing sleeve material, and then pressing the bearing sleeve material in the radial direction in a state of being bound in its axial direction to thrust its inner circumferential surface against the mold and cause plastic deformation is suggested (for example, refer to Japanese Unexamined Patent Publication No. 11-190344).

SUMMARY OF THE INVENTION

However, when the hydrodynamic grooves are molded in this manner, in a portion close to a portion which does not contact groove patterns in a region where a plurality of hydrodynamic grooves are arranged (hydrodynamic groove region), a compressive force which acts on the material is likely to escape, and accordingly it becomes difficult for a mass of a material to fill the recesses of the groove pattern. Therefore, for example in a hydrodynamic groove region of a radial bearing portion, as shown in FIG. 6B, a so-called "roll over" occurs, where the shape of the generating line on a land $18c$ between hydrodynamic grooves $18b$ becomes lower at both ends in the axial direction. In this case, as shown in FIG. 7, a gap width G1 at both axial ends of a radial bearing gap becomes greater than a gap width G2 at the axial central portion. Therefore, if the bearing is designed on the assumption that the gap width of the radial bearing gap is constant throughout its length in the axial direction, a hydrodynamic pressure effect is reduced in a portion where a gap width is large. Therefore, a desired hydrodynamic pressure effect cannot be obtained, whereby the bearing rigidity of the entire bearing is lowered.

Such a decrease in bearing rigidity can be recovered, for example, by setting the length of hydrodynamic groove regions $18a$, $18a$ in the axial direction longer. However, simply extending the length of the hydrodynamic groove region $18a$, $18a$ in the axial direction widens the narrow radial bearing gap in the axial direction, and thus fluid resistance in this bearing gap is increased. This results in an increase in rotational torque.

Similar problems can occur not only in the radial bearing portion but also in the hydrodynamic grooves of the thrust bearing portion. The hydrodynamic grooves in the thrust bearing portion are, for example, press-formed using a groove pattern having a shape corresponding to the hydrodynamic grooves. In that case, as mentioned above, plastic flow becomes insufficient in the vicinity of a region which does not contact the groove pattern, and a roll over is created in the shape of the generating line in the hydrodynamic groove region, producing a problem similar to that mentioned above.

An object of the present invention is to provide a fluid dynamic bearing apparatus which can avoid an increase in rotational torque and at the same time prevent a decrease in bearing rigidity based on the roll over of the shape of the generating line of the hydrodynamic groove region.

To achieve this object, a fluid dynamic bearing apparatus according to the present invention comprises a hydrodynamic groove region in which a plurality of hydrodynamic grooves are arranged, a smooth surface opposing the hydrodynamic groove region, and a bearing gap which is formed between the hydrodynamic groove region and smooth surface and in which a fluid dynamic pressure is produced by the relative rotation of a fixed side and a rotation side, and the smooth surface is defined by a step so that its length becomes shorter than that of the hydrodynamic groove region. It should be noted that the term "length" used herein means, when the directions of the normal of the smooth surface and hydrodynamic groove region coincide with the radial direction of the bearing (radial bearing portion), the length of its smooth surface and hydrodynamic groove region in the axial direction, and when the above direction of the normal coincides with the thrust direction of the bearing (thrust bearing portion), the length of its smooth surface and hydrodynamic groove region in the radial direction.

According to this constitution, since the length of the smooth surface is made shorter than that of the hydrodynamic pressure groove region, the smooth surface can be opposed to a central portion of the hydrodynamic groove region having an almost constant groove depth, excluding the edge of the hydrodynamic pressure groove region where the roll over is noticeable. Therefore, the radial bearing gap can be set to have an approximately constant width, and a decrease in the bearing rigidity can be avoided by designing the length of the entire hydrodynamic groove region so that a predetermined hydrodynamic pressure effect can be obtained in the bearing gap having this constant width. In this case, the length of the entire hydrodynamic groove region becomes longer than in conventional ones, but the smooth surface is stepped and defined by the step. Therefore, the roll over portions formed at the edge of the hydrodynamic groove regions are made to oppose the portions other than the smooth surface, and the gap width of this portion can be made greater than in the bearing gap having the constant width mentioned above. Hence, an increase in torque due to the fluid resistance can be minimized.

It should be noted that an example of the inventions which focus on the order of length of the smooth surface and hydrodynamic groove region is an invention described in Japanese Unexamined Patent Publication No. 2002-70842. In this invention, the length of the smooth surface is set longer than that of the hydrodynamic pressure groove region, and the order of length is thus opposite to that in the present invention.

The invention of the present application can be applied to the radial bearing portion constituted of a fluid dynamic bearing. The fluid dynamic bearing apparatus having the radial bearing portion comprises a bearing sleeve and shaft member, in addition to the aforementioned hydrodynamic groove region, smooth surface and bearing. A radial bearing gap as said bearing gap is formed between the inner circumferential surface of the bearing sleeve and the outer circumferential surface of the shaft member. The shaft member is supported in the radial direction in a non-contact manner by the fluid dynamic pressure formed in this radial bearing gap. In this case, for example, the hydrodynamic pressure groove region can be formed on the inner periphery of the bearing sleeve, while the smooth surface can be formed on the outer periphery of the shaft member.

The invention of the present application can be applied to a fluid dynamic bearing apparatus having a thrust bearing portion constituted of a fluid dynamic bearing. This fluid dynamic bearing apparatus is provided with a flange portion overhanging to the outer diameter side on the shaft member, and the bearing gap is also formed between the end face of the flange portion and a face opposing this end face, as well as in said radial bearing gap (thrust bearing gap). The shaft member is supported in the thrust direction in a non-contact manner by the fluid dynamic pressure formed in this thrust bearing gap. In this case, the hydrodynamic pressure groove region is formed on either the end face of the flange portion of the shaft member or the face opposing it, while the smooth surface is formed on the other.

The above hydrodynamic groove region is desirably formed by thrusting a pattern corresponding to its shape to carry out plastic processing and form a predetermined shape (herringbone shape, spiral shape, etc.). Since the pattern is thrusted, hydrodynamic groove molding by rolling is excluded. In addition, since it is plastically processed, hydrodynamic groove molding which does not involve plastic deformation of a material, for example, injection molding of a resin is also excluded.

Providing a motor with high rotational accuracy and low torque is enabled by constituting the motor of the fluid dynamic bearing apparatus mentioned above.

As mentioned above, according to a fluid dynamic bearing apparatus according to the present invention, an increase in rotational torque can be avoided and simultaneously a decrease in bearing rigidity based on the roll over of the shape of the generating line of the hydrodynamic groove region can be prevented.

DETAILED DESCRIPTION OF THE INVENTION

Embodiments of the present invention will be described below with reference to drawings.

Figure 1:
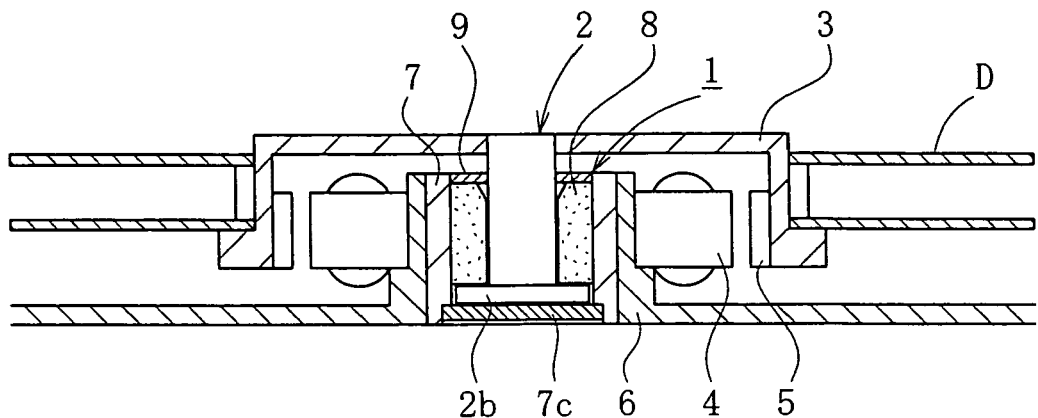
FIG. 1 shows a cross-sectional view of a spindle motor for an information appliance incorporating a fluid dynamic bearing apparatus according to one embodiment of the invention of the present application.

FIG. 1 conceptually shows the entire constitution of a spindle motor for an information appliance incorporating a fluid dynamic bearing apparatus according to an embodiment of the invention of the present application. This spindle motor for information appliances is for use in disk drive units such as HDDs, and comprises a fluid dynamic bearing apparatus 1 which rotatably supports a shaft member 2 in a non-contact manner, a disk hub 3 which is attached to the shaft member 2, and a motor stator 4 and a motor rotor 5 which oppose each other across a gap in the radial direction. The motor stator 4 is attached of to the outer periphery of a casing 6, while the motor rotor 5 is attached to the inner periphery of the disk hub 3. The housing 7 of the fluid dynamic bearing apparatus 1 is attached to the inner periphery of the casing 6. One or more disks D such as magnetic disks are retained on the disk hub 3. When the motor stator 4 is energized, the motor rotor 5 is rotated by the excitation between the motor stator 4 and motor rotor 5, whereby the disk hub 3 and shaft member 2 rotate together.

Figure 2:
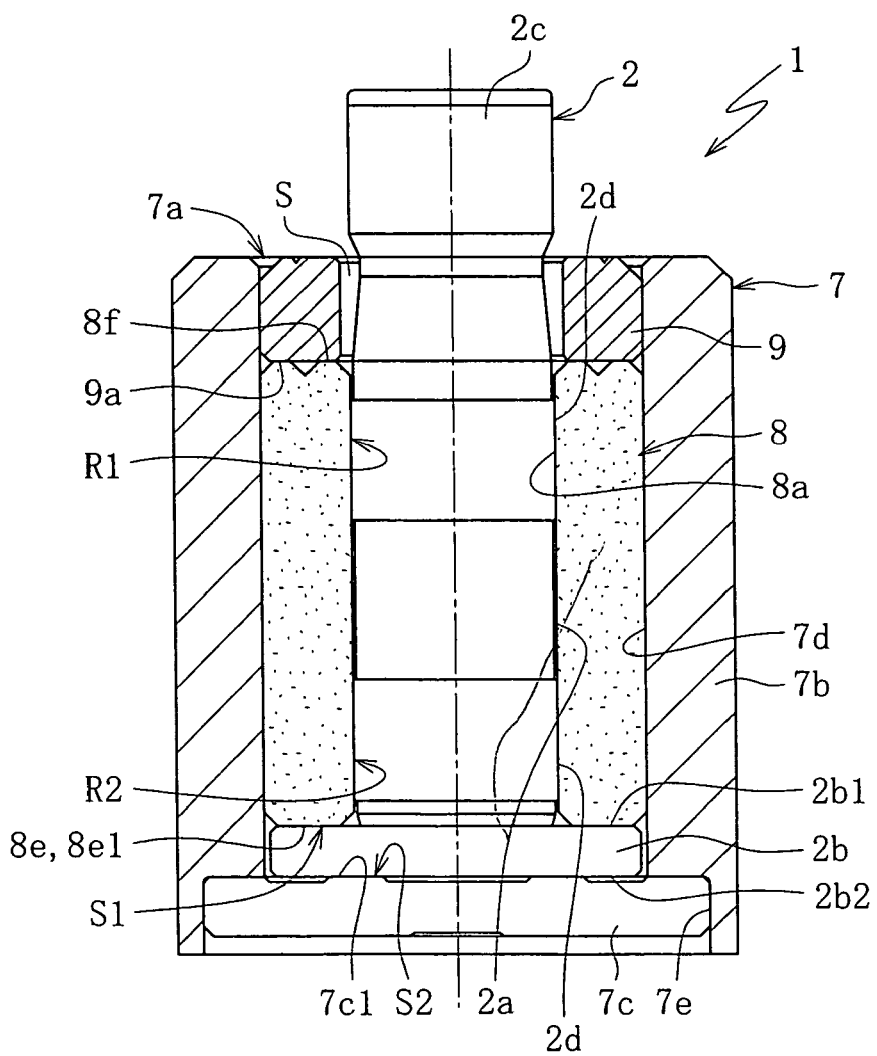
FIG. 2 is a cross-sectional view of a fluid dynamic bearing apparatus according to one embodiment of the invention of the present application.

FIG. 2 shows the fluid dynamic bearing apparatus 1. This fluid dynamic bearing apparatus 1 is constituted mainly of a bottomed cylindrical housing 7 having an opening portion 7a at one end and a thrust plate 7c at the other end, a cylindrical bearing sleeve 8 fixed on the inner periphery of the housing 7, the shaft member 2 inserted at the inner periphery of the bearing sleeve 8, and a sealing member 9 fixed on the opening portion 7a of the housing 7. It should be noted that for the sake of explanation, the side of the opening portion 7a of the housing 7 is referred to as the upper side, while the side of the thrust plate 7c of the housing 7 is referred to as the lower side in the following description.

The housing 7 is formed of, for example, a soft metallic material such as brass, and comprises a cylindrical side portion 7b and a disk lid-shaped thrust plate 7c which serves as the bottom of the housing 7 as separate structure. On the inner bottom face of the thrust plate 7c, for example, a spirally shaped hydrodynamic pressure groove region 7c1 in which a plurality of hydrodynamic grooves 7c2 (refer to FIG. 5) are arranged is formed by pressing. A large diameter portion 7e formed to have a diameter larger than the other portions is formed at the lower end of the inner circumferential surface 7d of the side portion 7b of the housing 7. The thrust plate 7c is fixed to this large diameter portion 7e by, for example, crimping, adhesion or other means.

Figure 3A:
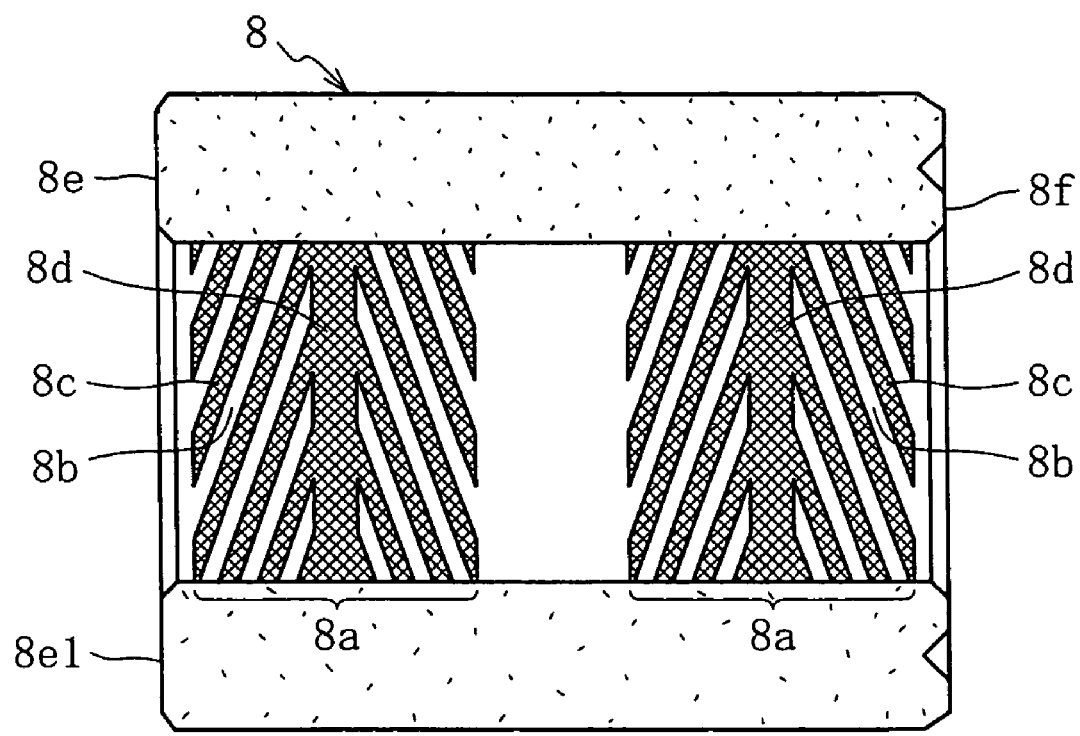
FIG. 3A is a cross-sectional view of the bearing sleeve.

The bearing sleeve 8 is formed of, for example, a porous body comprising a sintered metal, in particular a porous body made of a sintered metal comprising copper as a main ingredient into a cylindrical shape. On the inner periphery of the bearing sleeve 8, for example as shown in FIG. 3A, herringbone-shaped hydrodynamic groove regions 8a, 8a each comprising a plurality of hydrodynamic grooves 8b, 8b arranged therein are formed in two axially separate positions. On a lower end face 8e of the bearing sleeve 8, e.g., a spiral-shaped hydrodynamic groove region 8e1 in which a plurality of hydrodynamic grooves 8e2 (refer to FIG. 5) are arranged is formed.

The hydrodynamic groove regions 8a and the hydrodynamic groove region 8e1 of the lower end face 8e on the inner periphery of the bearing sleeve are both formed by molding. Among these, the hydrodynamic groove regions 8a formed on the inner circumferential surface of the bearing sleeve 8 are molded by inserting a core rod having a groove pattern corresponding to the shape of the hydrodynamic grooves of each region 8a at the inner periphery of the bearing sleeve material, pressing the bearing sleeve material in the radial direction in a state of being bound in its axial direction, and thrusting its inner circumferential surface against the core rod to print the shape of the groove pattern by the plastic deformation of the inner circumferential surface. The removal of the core rod from the pattern after such plastic processing can be smoothly carried out by the spring back of the bearing sleeve material caused by the release of the pressing force without interfering each other. The hydrodynamic groove region 8e1 formed on the lower end face 8e of the bearing sleeve 8 can be formed simultaneously with the hydrodynamic groove regions 8a on the inner circumferential surface by forming the groove pattern corresponding to the shape of the hydrodynamic grooves on the end face of a fixture (punch, etc.) which binds the bearing sleeve material in the axial direction.

Figure 3B:
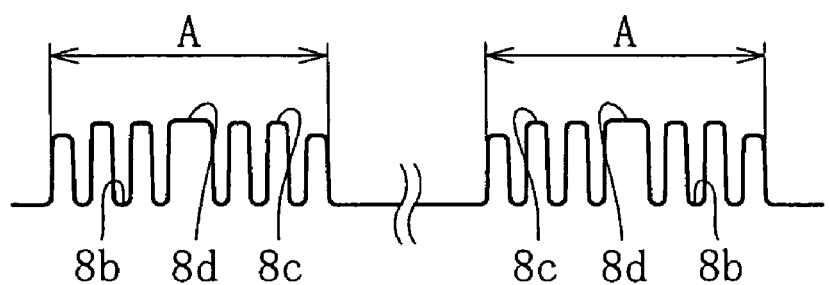
FIG. 3B is an enlarged view of the shape of the generating line in the axial direction of a hydrodynamic groove region on the inner periphery of the bearing sleeve.
Figure 4:
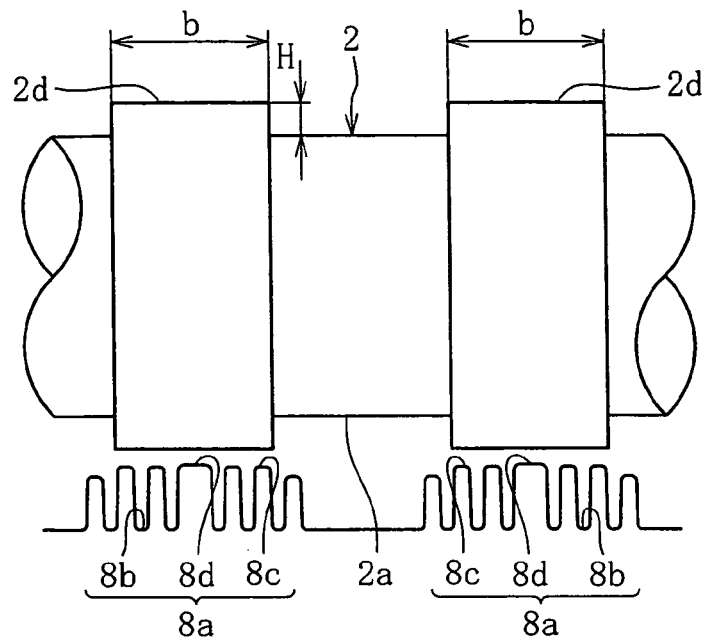
FIG. 4 is a schematic diagram which shows the positional relationship between a hydrodynamic groove region forming a radial bearing gap and a smooth surface in the radial direction.

The shaft member 2 is formed of, for example, stainless steel or like metallic material, and comprises a shaft portion 2c and a flange portion 2b which are integrally or separately provided at the lower end of the shaft portion 2c. As shown in FIG. 4 with enlargement, the shaft portion 2c is in the shape of a stepped shaft, and out of the outer circumferential surface 2a of the shaft portion 2c, in regions opposing the two hydrodynamic groove regions 8a of the inner periphery of the bearing sleeve after the bearing apparatus is assembled, cylindrical smooth surfaces 2d which have a diameter larger than other portions and no irregularity are formed, respectively. Both axial sides of these smooth surfaces 2d, 2d are divided from the outer circumferential surface 2a excluding the smooth surface 2d, 2d by a step H. Length dimensions B of both smooth surfaces 2d in the axial direction are both less than length dimensions A of the corresponding hydrodynamic groove regions 8a in the axial direction (refer to FIG. 3B), and the entire region of each smooth surface 2d, 2d oppose the hydrodynamic groove regions 8a.

It should be noted that in FIG. 4, to allow for easier comprehension, the dimension of the step H is illustrated with exaggeration. Actually, it is suitable that the step H is 10 μm or more. If the step H is less than 10 μm, the torque reducing effect described later may possibly be insufficient. Although the depth of the hydrodynamic grooves is actually about 1 to 20 μm, it is illustrated with exaggeration in the Fig.

The sealing member 9 has an annular shape. As shown in FIG. 2, the sealing member 9 is fixed to the inner circumferential surface of the opening portion 7a of the housing 7 by press fitting, adhesion or other means. In this embodiment, the inner circumferential surface of the sealing member 9 is formed into a cylindrical shape, and the lower end face 9a of the sealing member 9 is in contact with an upper end face 8f of the bearing sleeve 8.

After this fluid dynamic bearing apparatus 1 is assembled, the shaft portion 2c of the shaft member 2 is inserted at the inner periphery of the bearing sleeve 8, and the flange portion 2b is accommodated in a space between the lower end face 8e of the bearing sleeve 8 and the inner bottom face of the thrust plate 7c of the housing 7. At this time, a tapering sealing space S whose diameter gradually expands towards the outside of the housing 7 (upwards in the same Fig.) is formed between the inner circumferential surface of the sealing member 9 and the opposing tapering outer circumferential surface of the shaft portion 2c. The inner space of the housing 7 hermetically sealed by the sealing member 9, including the inner hole of the bearing sleeve 8, is filled with a lubricating oil. The oil level of the lubricating oil is maintained within the sealing space S.

When the shaft member 2 is rotated relative to the bearing sleeve 8 in this state, the hydrodynamic pressure of the lubricating oil is produced in each of the radial bearing gaps between the smooth surfaces 2d of the shaft member 2 and the opposing hydrodynamic groove regions 8a, and a first radial bearing portion R1 and a second bearing portion R2 which support the shaft member 2 in the radial direction in a non-contact manner are formed separately in the axial direction. Simultaneously, the hydrodynamic pressure of the lubricating oil is produced in each thrust bearing gap between the lower end face 8e of the bearing sleeve 8 and the upper end face 2b1 of the flange portion 2b of the shaft member 2 and between the inner bottom face of thrust plate 7c and the lower end face 2b2 of the flange portion 2b, forming a first thrust bearing portion S1 and a second thrust bearing portion S2 which support the shaft member 2 in the thrust direction in a non-contact manner.

In the hydrodynamic pressure groove regions 8a of the radial bearing portions R1, R2, a roll over occurs in the land portion 8c between the hydrodynamic grooves 8b at both axial ends in the shape of the generating line in their axial direction because they have been molded, as shown in FIGS. 3 and 4. In the present invention, however, the length dimension B of the smooth surface 2d in the axial direction is shorter than the length dimension A of the hydrodynamic groove regions 8a in the axial direction. Therefore, it is possible to remove roll overs at both ends of the hydrodynamic groove regions 8a from the regions opposing the smooth surfaces 2d and cause the smooth surfaces 2d to oppose the central portions of the hydrodynamic groove regions 8a having an approximately constant groove depth. The radial bearing gap can thus have an approximately constant width, and a decrease in bearing rigidity can be avoided by setting the length of the hydrodynamic groove regions 8a in the axial direction so that a predetermined hydrodynamic pressure effect can be obtained with the bearing gap having such a constant width. This means that the length of the hydrodynamic groove regions in the axial direction is set longer than in known bearing designs. Even in that case, by removing the roll over portions which is barely involved in the hydrodynamic pressure effect from the regions opposing the smooth surfaces 2d, making the smooth surfaces 2d oppose the outer circumferential surface 2a of the shaft portion having a diameter smaller than the smooth surfaces 2d to make the gap width of this portion greater than the bearing gap of the constant width by the step H. An increase in torque due to fluid resistance can be therefore minimized. Accordingly, two conflicting objects, i.e., improved bearing rigidity and reduced torque, can be achieved.

It should be noted that differences between the axial lengths of the hydrodynamic groove regions 8a and smooth surfaces 2d are determined depending on the length of roll over portions produced in the hydrodynamic groove regions 8a. In the existing circumstances, roll overs are produced within the range of about 0.2 mm from both axial ends of the hydrodynamic groove regions 8a. For this reason, it is desirable that the difference in the axial lengths mentioned above is at least twice greater than 0.2 mm, that is, at least 0.4 mm.

Figure 5:
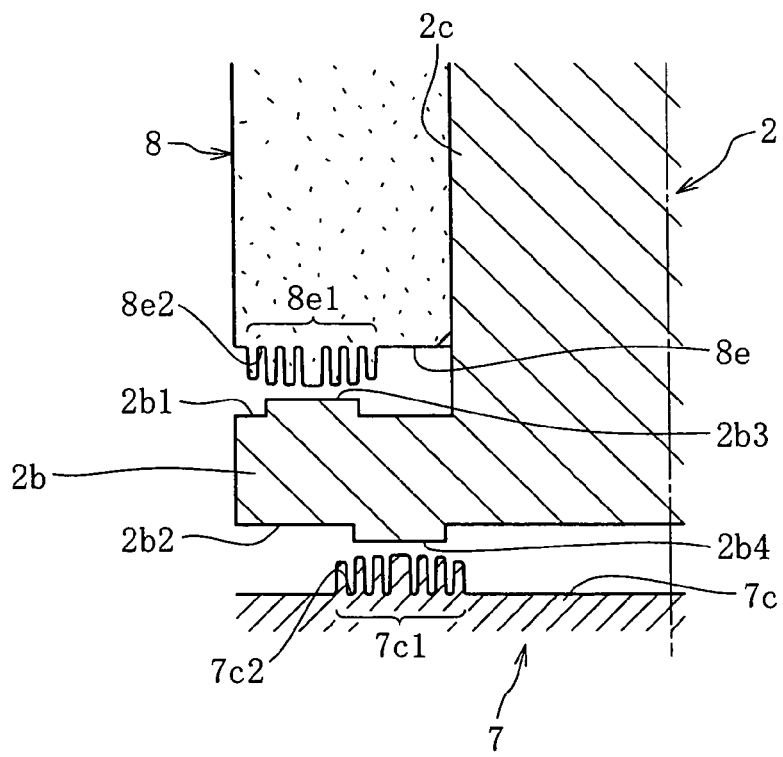
FIG. 5 is a schematic diagram which shows the positional relationship between a hydrodynamic groove region forming a thrust bearing gap and a smooth surface in the axial direction.
Figure 6A:
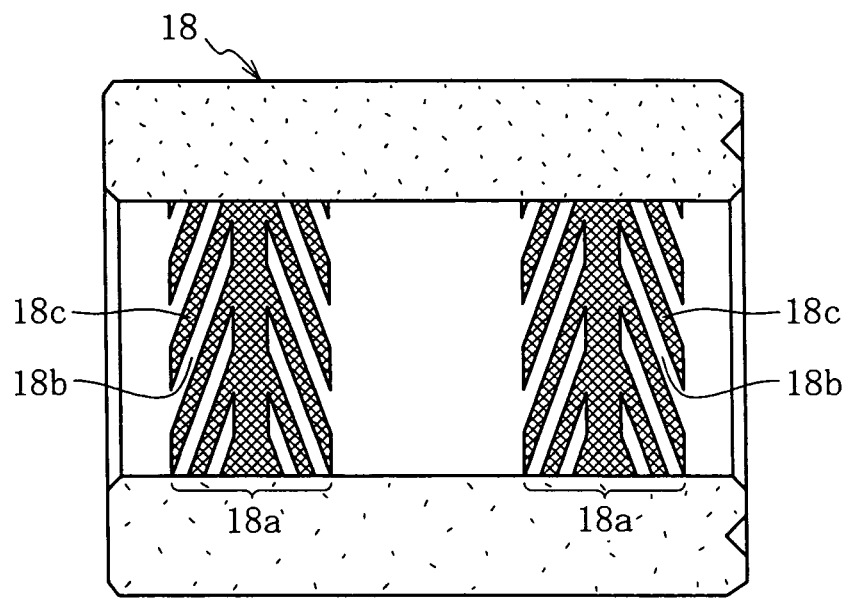
FIG. 6A is a cross-sectional view of a known bearing sleeve.
Figure 6B:
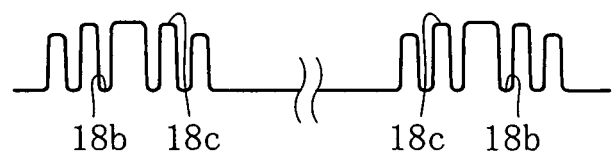
FIG. 6B is an enlarged view of the shape of the generating line of a hydrodynamic groove region on its inner periphery in the axial direction.
Figure 7:
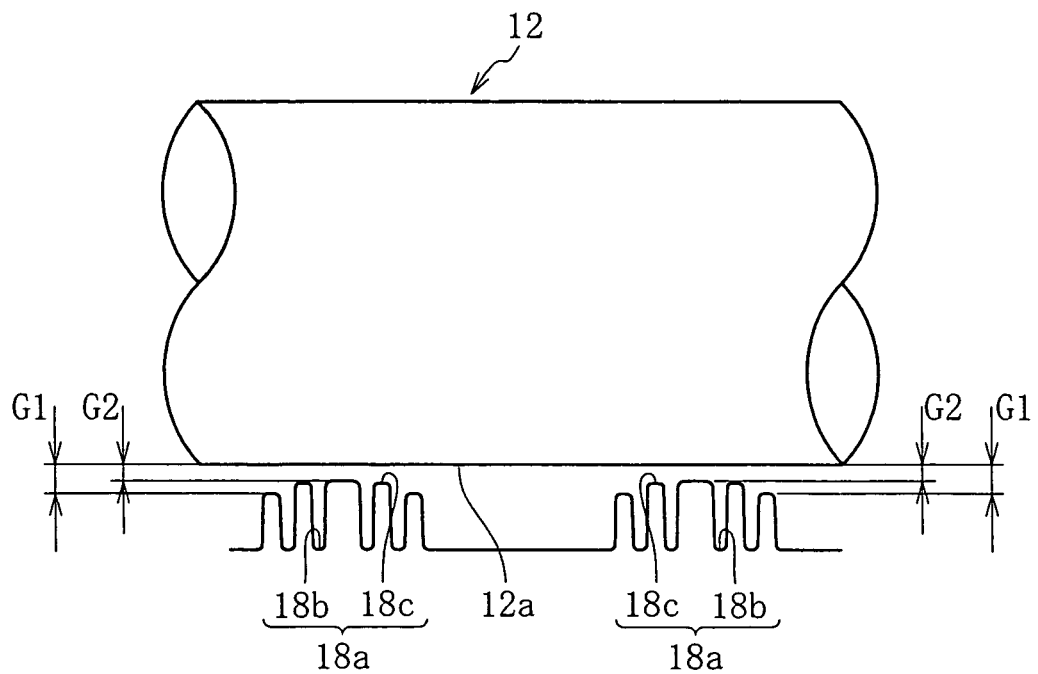
FIG. 7 is a schematic diagram which shows a conventional positional relationship between a hydrodynamic groove region forming a radial bearing gap and a smooth surface in the radial direction.

In the above description, the hydrodynamic groove regions 8a of the radial bearing portions R1, R2 are shown as examples, but a similar constitution can also be applied to the hydrodynamic groove regions 8e1, 7c1 of the thrust bearing portions S1, S2. These hydrodynamic groove regions 8e1, 7c1 are also formed by thrusting a groove pattern having a shape corresponding to the hydrodynamic grooves as mentioned above to plastically deform a material. Therefore, as schematically shown in FIG. 5, roll overs occur at both ends in the radial direction of the hydrodynamic pressure groove regions 8e1, 7c1, but smooth surfaces 2b3, 2b4 are defined with a step on both end faces 2b1, 2b2 of the flange portions opposing these hydrodynamic groove regions 8e1, 7c1, and the radial lengths of these smooth surfaces 2b3, 2b4 are made shorter than those of the opposing hydrodynamic groove regions 8e1, 7c1. This enables achieving both improved bearing rigidity and reduced torque in the thrust bearing portions S1, S2. It should be noted that in FIG. 5, as well as in FIG. 4, the groove depths of the hydrodynamic grooves 8e2, 7c2 are illustrated with exaggeration.

In this embodiment, an example in which the hydrodynamic groove region 8e1 is formed on the lower end face 8e of the bearing sleeve 8, while the first smooth surface 2b3 is formed on the upper end face 2b1 of the flange portion 2b of the shaft member 2 is shown. However, contrary to this example, it is possible to form the smooth surface on the lower end face 8e of the bearing sleeve 8 and the hydrodynamic groove region on the upper end face 2b1 of the flange portion 2b. The hydrodynamic groove region 7c1 formed on the inner bottom face of the thrust plate 7c of the housing 7 and the second smooth surface 2b4 formed on the lower end face 2b2 of the flange portion 2b of the shaft member 2 can be also formed interchangeably with their opposing faces similarly.

This fluid dynamic bearing apparatus is suitable for use in spindle motors for information appliances, for example, HDD and like magnetic disk apparatuses, CD-ROM, CD-R/RW, DVD-ROM/RAM and like optical disk apparatuses, MD, MO and like magneto-optic disk apparatuses, polygon scanner motors for laser beam printer (LBP) and other small motors.

The invention claimed is:

1. A fluid dynamic bearing apparatus comprising:
a hydrodynamic groove region in which a plurality of hydrodynamic grooves are arranged;
a smooth surface opposing the hydrodynamic groove region; and
a bearing gap disposed between the hydrodynamic groove region and the smooth surface and in which a fluid dynamic pressure is produced by relative rotation between the smooth surface and the hydrodynamic groove region,
wherein the hydrodynamic groove region includes first and second roll-over portions, the roll-over portions being generated when the hydrodynamic groove region is formed by thrusting a pattern corresponding to the shape of the hydrodynamic groove region so as to carry out plastic processing such that the first and second roll-over portions are disposed at first and second ends of the hydrodynamic groove region, respectively, and
the smooth surface is defined by a step so as to have a length shorter than a length of the hydrodynamic groove region so that the smooth surface opposes the hydrodynamic groove region except at the first and second roll-over portions of the hydrodynamic groove region.

2. A fluid dynamic bearing apparatus according to claim 1 further comprising a bearing sleeve and a shaft member, said bearing gap being disposed between an inner circumferential surface of the bearing sleeve and an outer circumferential surface of the shaft member.

3. A motor having a fluid dynamic bearing apparatus according to claim 2.

4. A fluid dynamic bearing apparatus according to claim 2, wherein the shaft member has an outer diameter side and includes a flange portion having an end face, the flange portion overhanging to the outer diameter side, and said bearing gap is disposed between the end face of the flange portion and a face opposing the end face.

5. A motor having a fluid dynamic bearing apparatus according to claim 4.

6. A motor having a fluid dynamic bearing apparatus according to claim 1.

* * * * *